United States Patent
Swinford

(10) Patent No.: US 8,830,321 B2
(45) Date of Patent: Sep. 9, 2014

(54) PRODUCING HIGH-RESOLUTION IMAGES OF THE COMMONLY VIEWED EXTERIOR SURFACES OF VEHICLES, EACH WITH THE SAME BACKGROUND VIEW

(76) Inventor: Stephen Michael Swinford, Magnolia, TX (US)

( * ) Notice: Subject to any disclaimer, the term of this patent is extended or adjusted under 35 U.S.C. 154(b) by 623 days.

(21) Appl. No.: 13/044,254

(22) Filed: Mar. 9, 2011

(65) Prior Publication Data

US 2011/0221905 A1   Sep. 15, 2011

Related U.S. Application Data

(60) Provisional application No. 61/311,875, filed on Mar. 9, 2010.

(51) Int. Cl.
- *H04N 7/18* (2006.01)
- *H04N 7/00* (2011.01)
- *G06T 13/00* (2011.01)

(52) U.S. Cl.
CPC . *H04N 7/18* (2013.01); *Y04S 30/12* (2013.01); *Y02T 90/168* (2013.01)
USPC ............................. 348/148; 348/37; 345/473

(58) Field of Classification Search
None
See application file for complete search history.

(56) References Cited

U.S. PATENT DOCUMENTS

| | | | | |
|---|---|---|---|---|
| 2,140,602 A * | 12/1938 | Simjian | ......................... | 396/338 |
| 4,236,795 A * | 12/1980 | Kephart | ............................ | 396/5 |
| 5,726,705 A * | 3/1998 | Imanishi et al. | ................ | 348/92 |
| 5,944,598 A * | 8/1999 | Tong et al. | .................... | 452/158 |
| 6,529,627 B1 * | 3/2003 | Callari et al. | ................. | 382/154 |
| 7,803,031 B1 | 9/2010 | Winckler | | |
| 2001/0024533 A1* | 9/2001 | Kriegman | ..................... | 382/284 |
| 2004/0183803 A1* | 9/2004 | Longo | ........................... | 345/473 |
| 2004/0227751 A1 | 11/2004 | Anders | | |
| 2005/0234612 A1* | 10/2005 | Bottomley et al. | ............ | 701/23 |
| 2006/0227133 A1* | 10/2006 | Petrov et al. | ................... | 345/419 |
| 2007/0114345 A1* | 5/2007 | Lee et al. | ....................... | 248/166 |
| 2008/0013691 A1* | 1/2008 | Gregerson et al. | ............. | 378/198 |
| 2008/0056569 A1* | 3/2008 | Williams et al. | ................ | 382/173 |
| 2009/0160930 A1* | 6/2009 | Ruppert | ........................... | 348/37 |
| 2010/0201848 A1* | 8/2010 | Fukui | .............................. | 348/234 |
| 2011/0080564 A1* | 4/2011 | Taylor | ............................ | 352/243 |
| 2011/0128354 A1* | 6/2011 | Tien et al. | ........................ | 348/50 |

* cited by examiner

*Primary Examiner* — Joseph Ustaris
*Assistant Examiner* — Ellyar Y Barazesh
(74) *Attorney, Agent, or Firm* — Eric P Mirabel

(57) ABSTRACT

Disclosed is an apparatus and a process for producing and viewing through the internet high-resolution images of the commonly viewed exterior surfaces of a vehicle, while maintaining the same background view for multiple images of the vehicle. The background and the imaging device are revolved around a vehicle which is maintained in fixed position between the background and the imaging device. The vehicle does not need to be rotated or moved during the imaging.

19 Claims, 9 Drawing Sheets

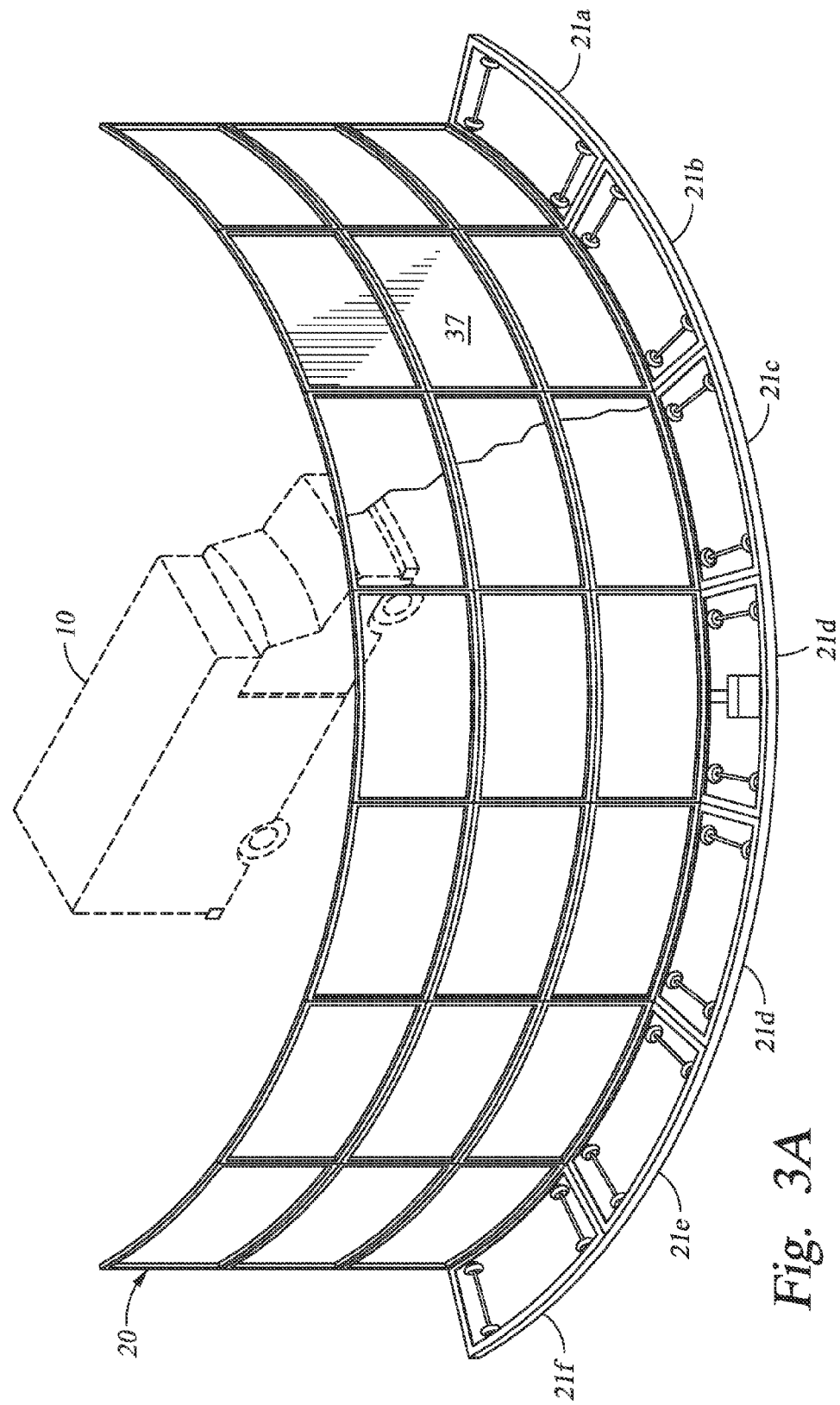

US 8,830,321 B2

PRODUCING HIGH-RESOLUTION IMAGES OF THE COMMONLY VIEWED EXTERIOR SURFACES OF VEHICLES, EACH WITH THE SAME BACKGROUND VIEW

RELATED APPLICATION

The present application claims priority to U.S. provisional patent application No. 61/311875, filed Mar. 9, 2010.

FIELD OF THE INVENTION

The invention relates to production and viewing, through the Internet and without image downloading or high bandwidth requirements, of high-resolution images of the commonly viewed exterior surfaces of a vehicle, while maintaining the same background view for multiple images of the vehicle.

BACKGROUND

In the used car market, views of the exterior of the car (but not usually the underside) are typically required by and provided to the buyer before consummating a transaction. High resolution images showing small flaws and damage to the vehicle are preferred. One method of making these images is to rotate the vehicle on a turntable and create a series of images against a consistent background. The images can be displayed and viewed in a manner to generate a virtual 360 degree tour of the vehicle.

The two problems with this approach are that a turntable for a vehicle is a heavy, expensive and complex piece of equipment, and that high resolution images require long delays to download—or cannot be downloaded and viewed by a potential vehicle purchaser without considerable bandwidth. An additional problem is that the uppermost side of a vehicle is often not shown unless a robot for moving the imaging device is used. See FSI Viewer (Neptunelabs Gmbh).

SUMMARY

In a first aspect, the invention is a process of producing and viewing through the internet high-resolution images of the commonly viewed exterior surfaces of a vehicle, while maintaining the same background view for multiple images of the vehicle. The images are stored on a server accessible through the internet, and can be selectively zoomed and viewed, so that less bandwidth is required than if the entirety of all the high-resolution images was accessible for each isolated view through the internet.

This process involves producing multiple images of a vehicle (still frame or video) by revolution of both an imaging device and a display around a vehicle which is in a fixed position between them, such that as the imaging device captures multiple images of the vehicle, the display is also captured in each of said images. The images are sufficiently pixilated such that damage to the vehicle exterior surface can be viewed when the images are displayed—or different views of the images may not show all details, so as to avoid requirements for large data streams. The images are uploaded to a server and can be viewed remotely through the internet, without downloading of the images.

Another aspect of the invention is an apparatus for producing images of the commonly viewed exterior surfaces of a vehicle, while maintaining the same background view for multiple images of the vehicle. The apparatus includes an imaging device (producing still frame or video) and a display wherein the imaging device can be revolved around a vehicle which is in a fixed position between them. The imaging device and the display revolve around the vehicle in the same direction and at the same rate such that as the imaging device captures multiple images of the vehicle, the display is captured in each of said multiple images. The imaging device and the display are preferably wheeled and can be linked to ensure coordinated revolution, or otherwise timed to coordinate their movement and maintain their relative positions.

The degree of arc followed by the display and the imaging device can be adjustable—for example, by using wheels which rotate on a vertical axis to control direction—or by using fixed wheels set to generate a particular arc for the display and the dolly or carrier rack which transport the imaging device. The display and the dolly or carrier rack themselves can also be arced, and can be composed of multiple sections, for easy transport. The dolly or carrier rack for the imaging device can also carry other components including lighting (projecting towards the vehicle), a computer (to upload images), a seat for an operator, a drive motor to power the revolution, a power source, an adjustable holder for the imaging device (which may extend upwardly to allow capturing images of the uppermost side of the vehicle), and other components, e.g., a timer, digital compass or a travel sensor to control when images are captured.

Other aspects of the invention are shown in the drawings and described in the Detailed Description below.

BRIEF DESCRIPTION OF THE DRAWINGS

FIG. 3A is an elevational view depicting a transparent display with the truck behind it, and a screen on the upper portion of the display.

DETAILED DESCRIPTION

Figure 1:
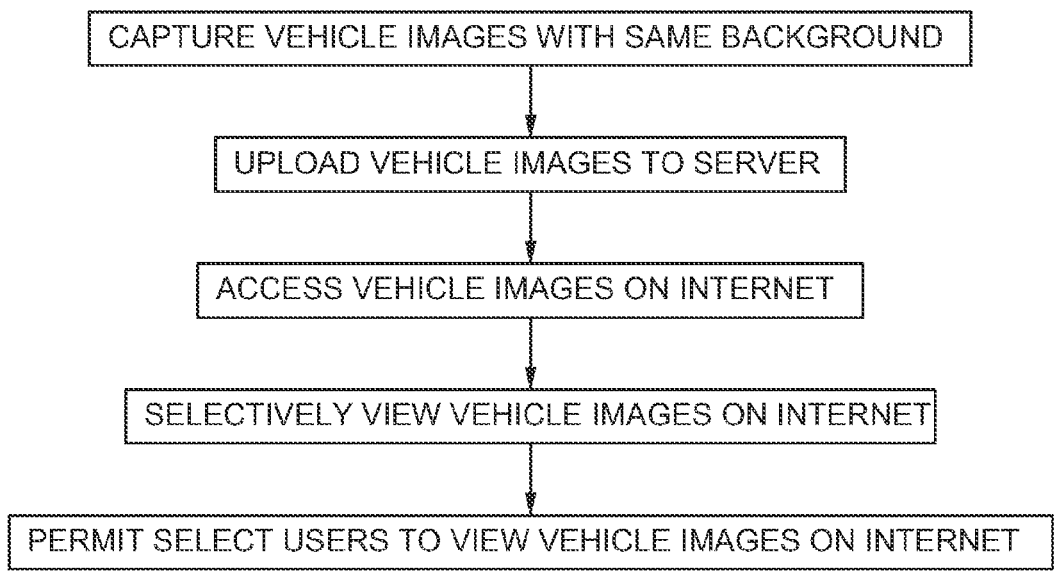
FIG. 1 is a flow diagram showing the capture and viewing of vehicle images as described herein over the internet from a server, without downloading required for viewing.

FIG. 1 is a flow diagram depicting the capture and display of high-resolution images of a vehicle through the internet, where the images have the same background. The image files can be automatically uploaded to a server, after capture, and are retained on the server. Select images and select portions of the high-resolution images can be viewed on the internet, so as not to require excessive bandwidth for viewing, or image downloading from the server to the viewer's computer. FSI Viewer (Neptunelabs Gmbh) provides this type of capture and image display over the internet. Portions of particular images can be selectively zoomed to display them, so that the entirety of all portions of all images is not streamed at the same instant. Other programs to accomplish these ends may also be used.

Referring to FIG. 10, an arm 100 is shown arcing above a vehicle 10, where arm 100 has an imaging device 102 positioned to capture images of the uppermost surface of the vehicle. Device 102 can slide along arm 100 to also capture images of the sides of vehicle 10, or device 102 can be fixed to only capture the uppermost vehicle surface, and a separate imaging device (device 33 in FIGS. 2 and 3) can capture the sides of vehicle 10. Device 102 can also be fixed elsewhere (such as to a beam joining carriers 20 and 30) to allow viewing the uppermost part of vehicle 10. The use of device 102 in this manner allows one to generate a simulated three-dimensional view of the vehicle 10, which can be rotated through at least one axis during viewing to show different portions of the exterior surface of the vehicle.

It is possible to view the images directly from the imaging device or from the server, or by downloading the images to a viewer's computer. For wide access for many viewers to the images, the arrangement in FIG. 1 is preferred.

Figure 2:
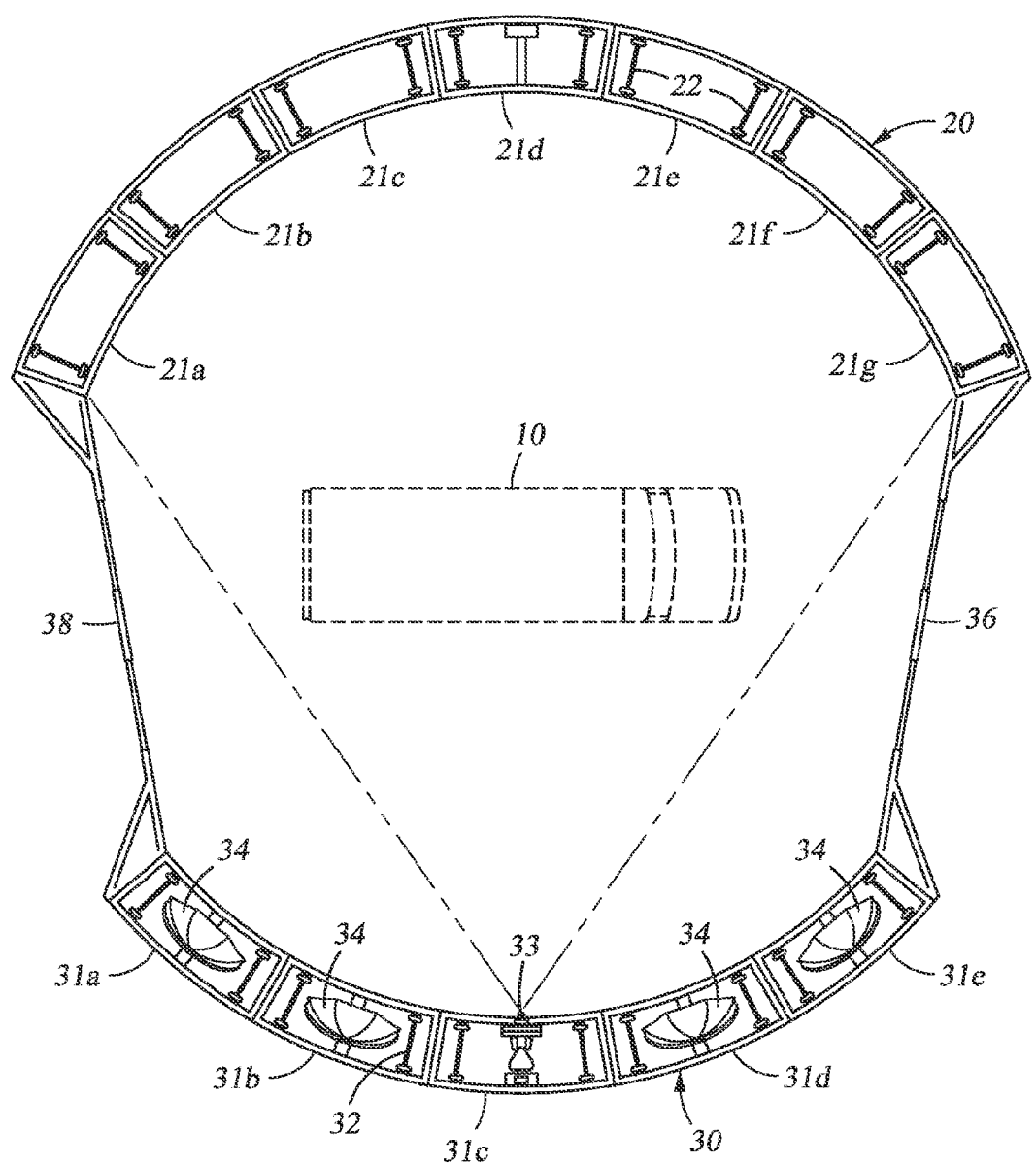
FIG. 2 is a plan view of a vehicle with an arced display carrier and an arced carrier for the imaging device and the lighting.
Figure 3:
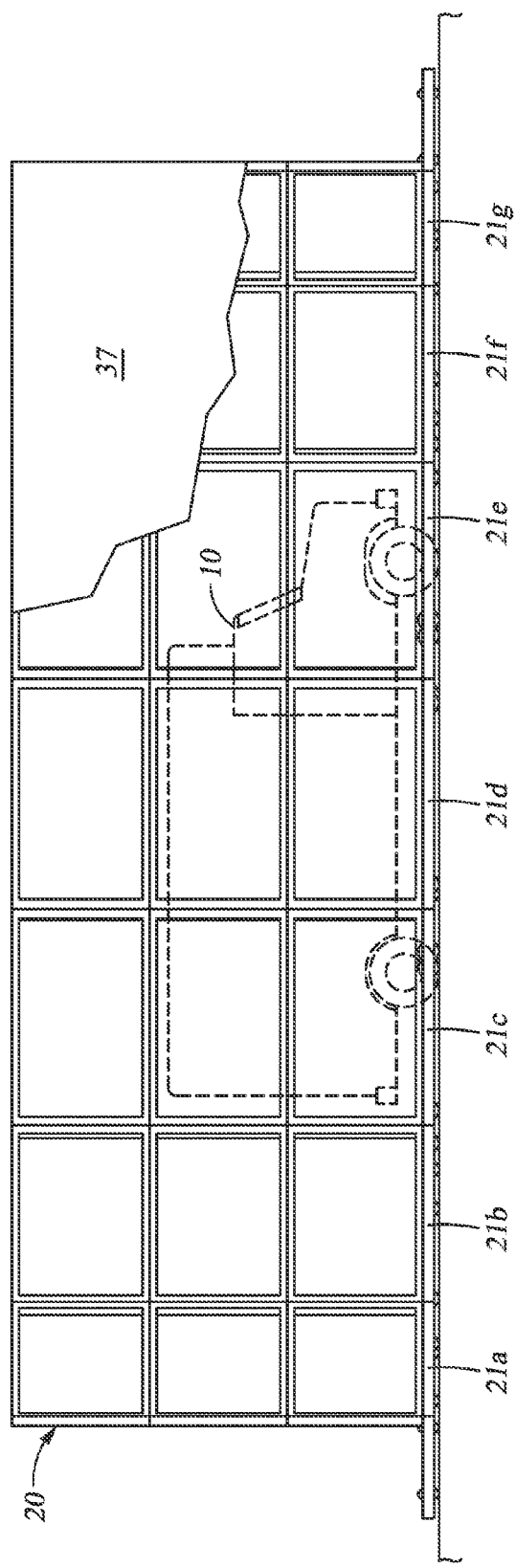
FIG. 3 is an elevational view of a vehicle with the display behind it.
Figure 4:
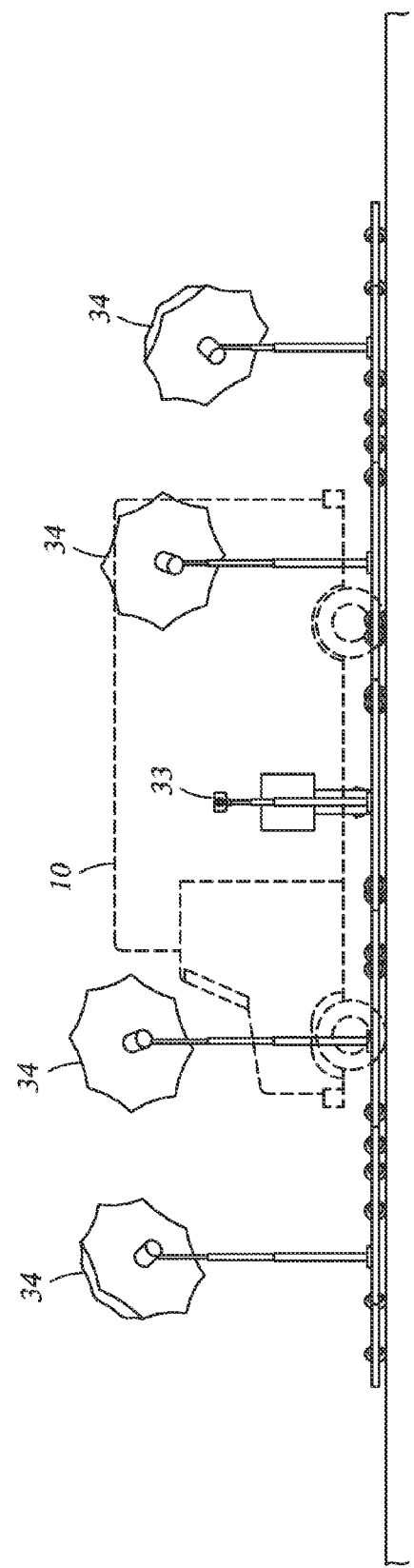
FIG. 4 is an elevational view of a vehicle with the arced carrier of FIG. 2 behind it.

Referring to FIGS. 2 to 4, a vehicle 10 is centered between a background display carrier 20 and a carrier 30. Carrier 30 includes an imaging device 33 and lighting 34. Lighting 34 can be strobe lighting coordinated to be on when each image is captured by device 33, or other lighting. The capture of images can be timed or otherwise controlled to create a series of images showing the entire surface. Another method of controlling image capture is using a digital compass 23a or a travel sensor (FIG. 9) associated with the carrier 20 or 30, and thereby controlling image capture as the carriers 20 and 30 move a predetermined amount.

Both carriers 20 and 30 consist of five separate sections (21a-21e and 31a-31e, respectively). Having multiple sections makes carriers 20 and 30 more convenient to transport or store, following breaking them down into the sections. More or fewer sections for carriers 20 and 30, or no sections, are also feasible. Each of the sections 21a-21e are equipped with two pairs of wheels 22, on an axle 24, and each of the sections 31a-31e are equipped with two pairs of wheels 32, on an axle 34.

The carriers 20 and 30 are arced as shown, and the wheels 22 and 32 would normally be in fixed position with respect to the vertical axis, so that carriers 20 and 30 follow the path their arc's define as they revolve around vehicle 10 on wheels 22 and 32. However, it is possible for the aspect of wheels 22 and 32 to be adjustable so that carriers 20 and 30 can follow different arced paths.

Arms 36 and 38 link the ends of carriers 20 and 30, so that they revolve together. Arms 36 and 38 should provide enough clearance to permit vehicle 10 to move in and out from its position between carriers 20 and 30. Carriers 20 and 30 could also be linked with other arrangements, including one beam which is affixed to the ceiling, or carriers 20 and 30 could be separately powered, provided their movement is coordinated.

In FIGS. 3 and 3A a screen 37 is shown partially in place over the vehicle 10 side of carrier 20. When screen 37 is fully lowered, it displays a desirable background for the vehicle 10 when its images are captured by imaging device 33. The background on the screen 37 can be any type, including a green screen.

Figure 5:
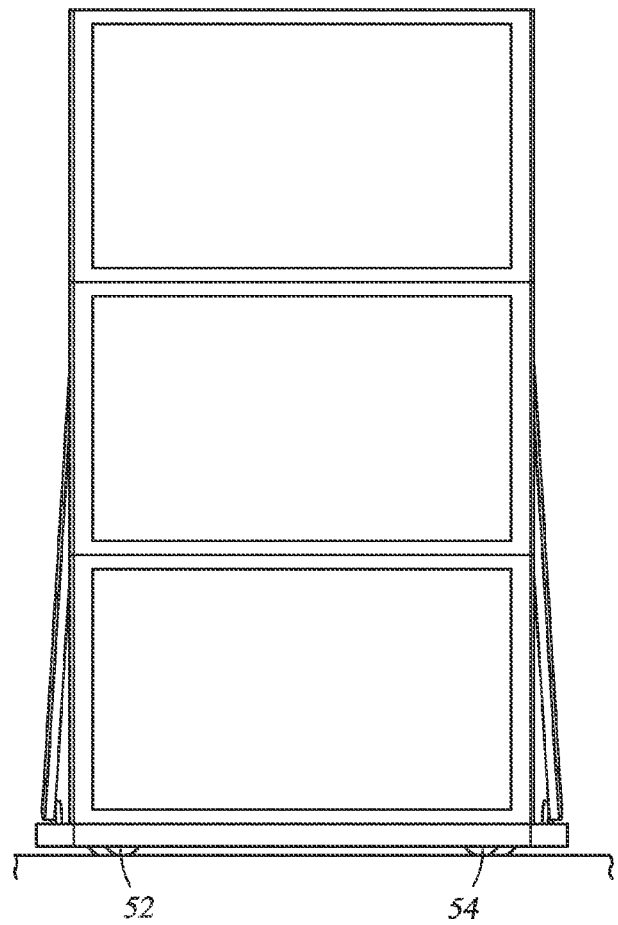
FIG. 5 is an elevational view of a display carrier with wheel direction adjustable to direct the display carrier through different arcs.
Figure 5A:
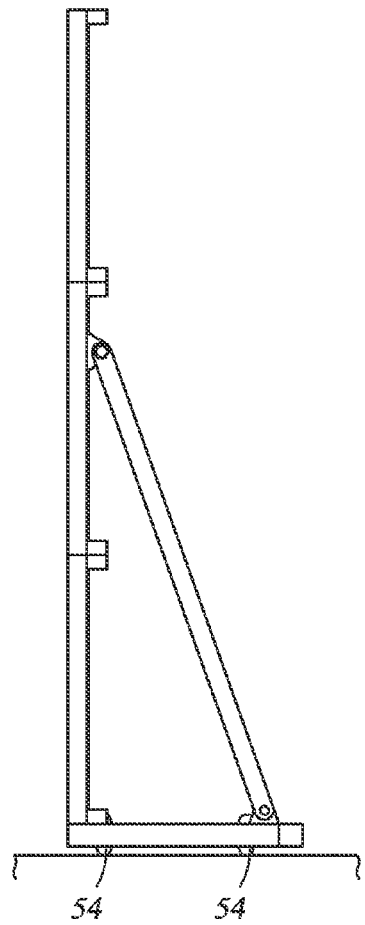
FIG. 5A is a side view of the display carrier of FIG. 5, showing the support for the display and the direction adjustment for the wheels.
Figure 6:
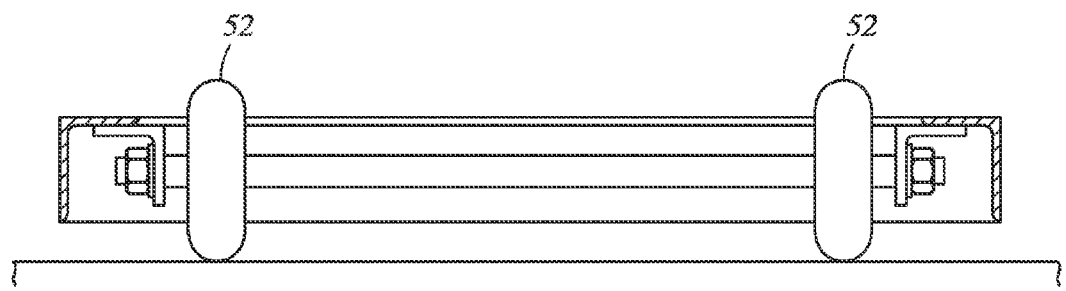
FIG. 6 is an enlarged view of the view of the wheels and axle of FIG. 5A.

FIG. 5 is a plan view of a carrier 50 having a first set of wheels 52 and a second set of wheels 54. At least one of the sets of wheels 52 or 54 can be rotated with respect to the vertical axis (as shown for wheels 52 in FIG. 6) to allow the carrier 50 to move on a variety of arced paths. Carrier 50 optionally has the same features as carrier 20, such as multiple sections and a screen over one side displaying a background. Carrier 50 can be used with a dolly 70 shown in FIG. 7.

Figure 7:
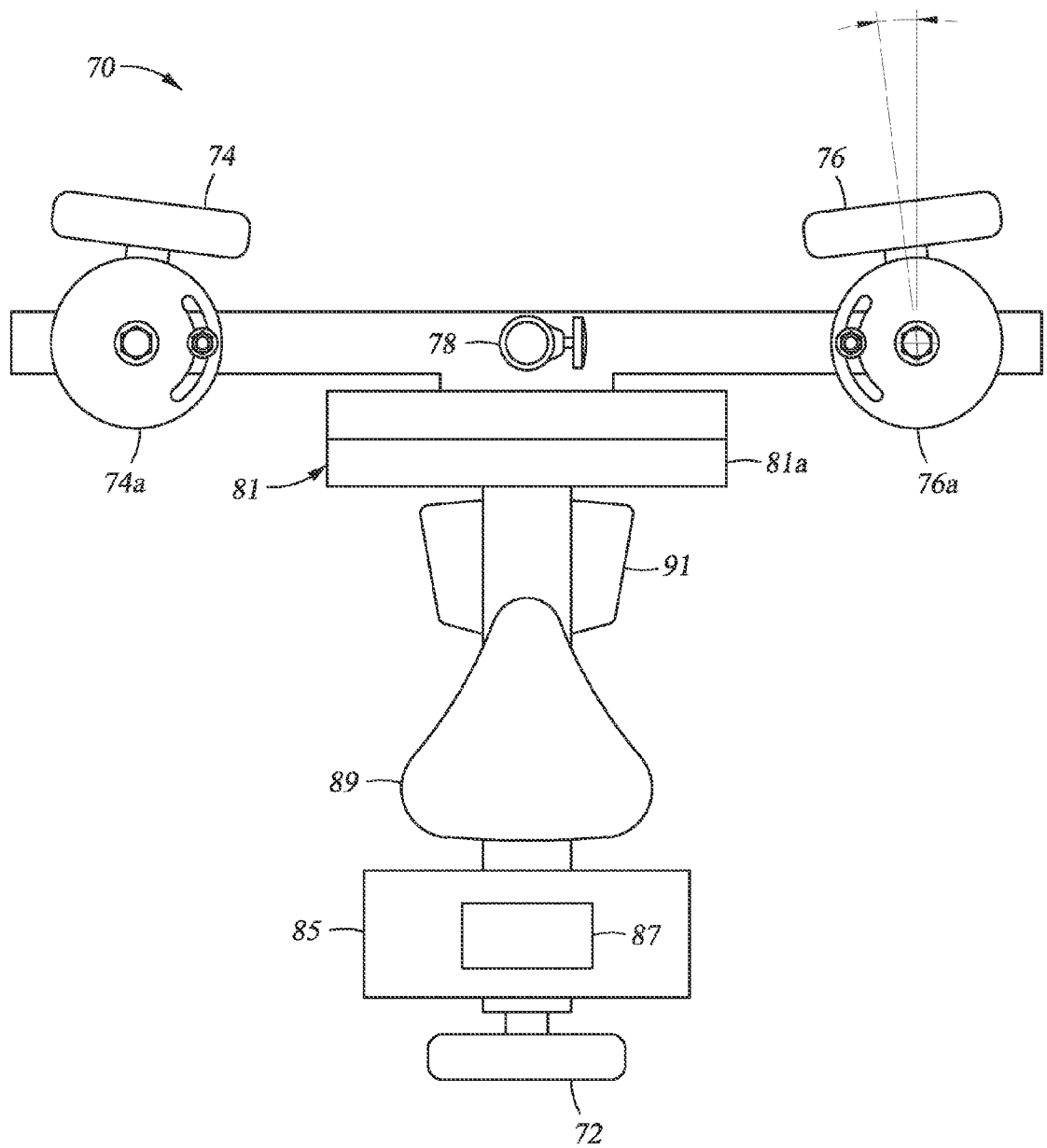
FIG. 7 is a plan view of a motorized wheeled dolly (where the wheels control direction) for carrying an operator, an imaging device (on a tripod), a computer, lighting and other components.
Figure 8:
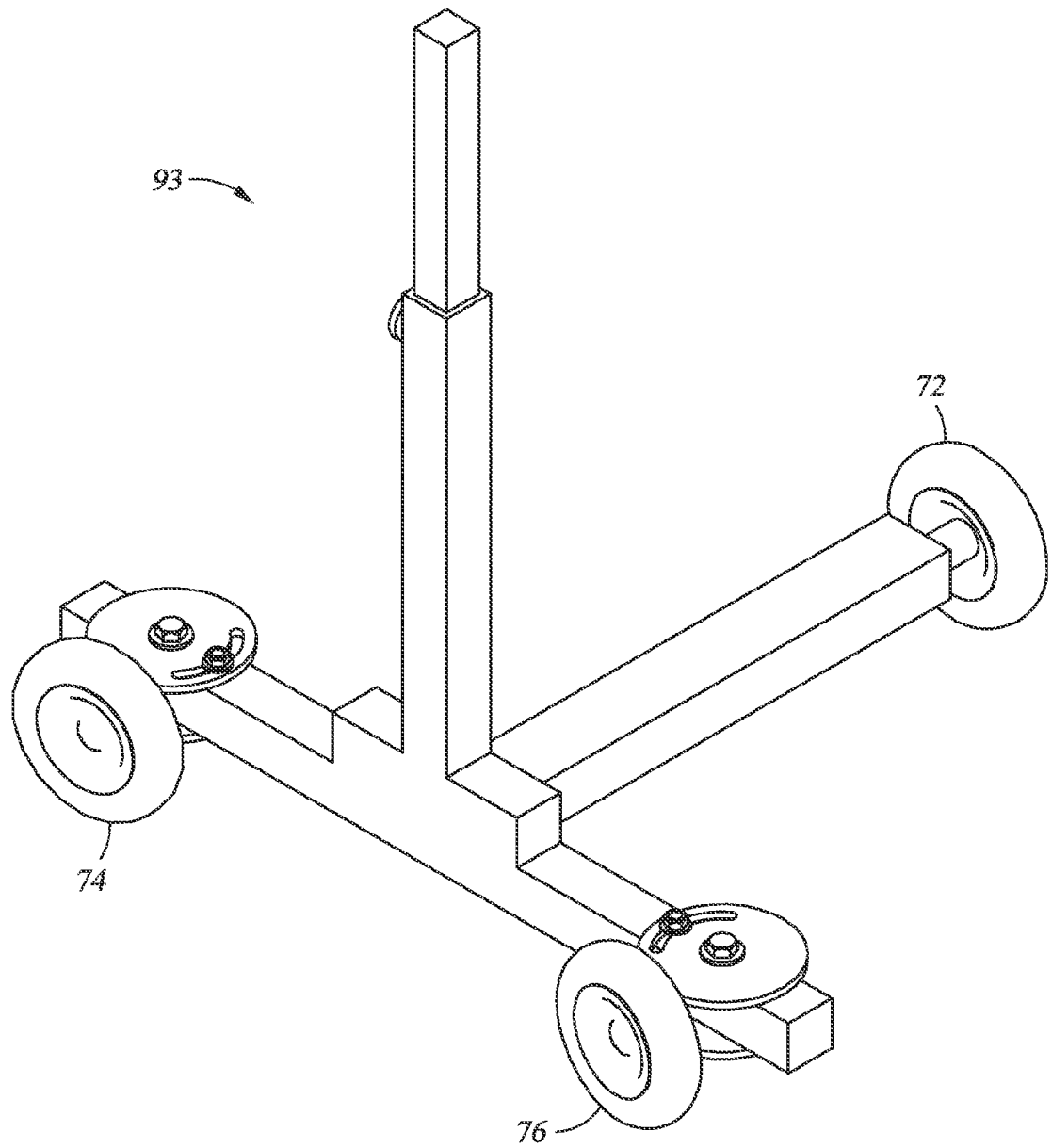
FIG. 8 is an elevational view of the chassis and wheels of the dolly of FIG. 7.
Figure 9:
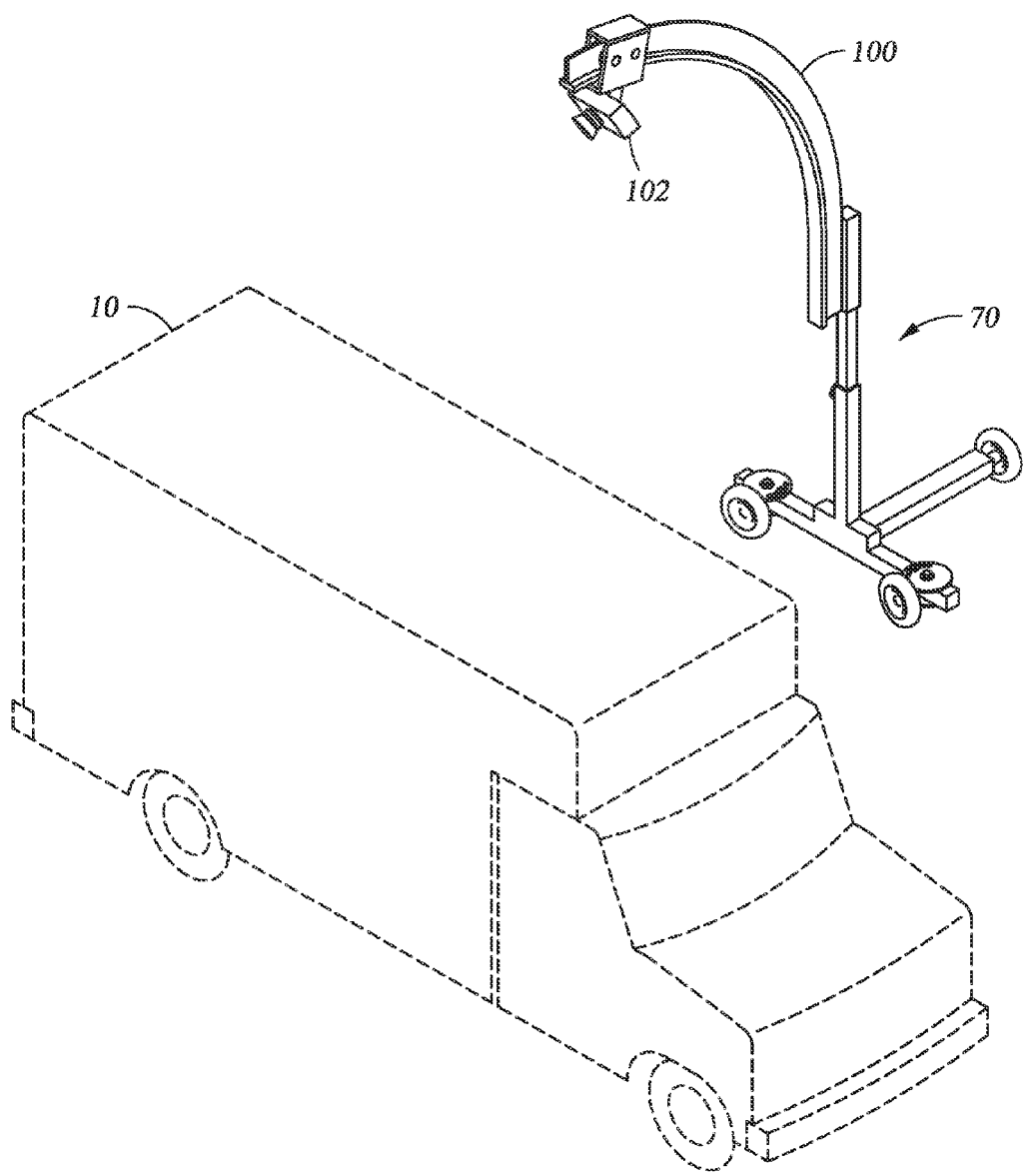
FIG. 9 is an elevational view of an arm with an imaging device attached

In FIG. 7, dolly 70 has three wheels, 72, 74 and 76, a tripod docking station 78 (where an adjustable imaging device docking station can be attached to the tripod). Wheels 74 and 76 can be rotated to the other side of support 75 by rotating plates 74a and 76a through ½ turn, so that dolly 70 can follow an arc in either direction. FIG. 7 shows a computer docking station 81 for a computer, and a motor 85 or other drive unit. Batteries 87 are shown as well. Computer 81 can upload images from device 33 or 102, automatically or under operator control, from where the images can be viewed or transferred to a server. It also shows a seat 89 for an operator, and foot pegs 91. FIG. 9 shows a telescoping tripod 93, to which an imaging device can be affixed. The imaging device can be attached with a movable mount, so it can shoot at a variety of angles.

Motor 87 can drive the wheel 72 in either direction to cause revolution of the dolly 70 about the vehicle (vehicle 10 in FIGS. 2 to 4) in either direction. Dolly 70 can be linked to carrier 50, or carrier 50 can be independent and have its own motor and movement control. In the case where dolly 70 and carrier 50 have their own motors, their relative positions to each other and to the vehicle being imaged could be maintained using electronic beams and receptors on dolly 70 and carrier 50, which control the motors to maintain the beams and receptors in alignment. One could also use other methods of movement control i.e., a digital compass 23a or a travel sensor.

Motor 87 or other motors on carrier 50 or dolly 70 can be electric, gas or diesel, and the dolly 70 can include a position to carry the energy source for motor 87, including a photovoltaic cell or a battery.

FIG. 9 shows an arm 100 for carrying an imaging device which can capture the upper surfaces of vehicle 10. The imaging device 102 can slide up and down along arm 100 and also be locked into position along the sliding arc. Arm 100 would be attached to dolly 70 or the carriers 20 or 30.

It should be understood that the terms and expressions used herein are exemplary only and not limiting, and that the scope of the invention is defined only in the claims which follow, and includes all equivalents of the subject matter of the claims.

What is claimed is:

1. An apparatus for producing images of the commonly viewed exterior surfaces of a vehicle, while maintaining the same background view for multiple images of the vehicle, comprising:

an imaging device mounted on a first support having wheels which rest on a support surface, and a display on one surface of a second support having wheels which rest on the support surface, and wherein the wheels on the first and second supports rotate on an axis such that the arc the first and second supports follow as they move on the support surface can be altered; and where the first and second supports are opposed and their only physical linkage is by arms which run between and join the ends of the first and second supports together, wherein the arms are positioned high enough relative to the support surface such that the vehicle can pass underneath the arms, and wherein the vehicle is in a fixed position between the first and second supports and resting on the support surface, such that the imaging device is revolved around the vehicle so as to capture multiple images of the vehicle during each revolution, and the display is also revolved around the vehicle because of the physical linkage of the first and second supports with the arms such that the display is also captured in each of said images, and wherein said images are sufficiently pixilated such that damage to the vehicle exterior surface can be viewed when the images are displayed.

2. The apparatus of claim 1 further including tracks which define the arc of revolution of the first and the second supports.

3. The apparatus of claim 1 wherein one or more motors mounted on the first and the second supports drive one or more wheels on the first and the second supports.

4. The apparatus of claim 3 wherein the motors can drive the wheels in either direction to cause revolution of the imaging device and the display in either direction.

5. The apparatus of claim 3 further including a source of energy for the motors mounted on the first or the second support.

6. The apparatus of claim 5 wherein the source of energy is a photovoltaic conversion cell or a battery.

7. The apparatus of claim 1 wherein the vehicle's wheels are resting on the same plane as the wheels of the first and the second supports.

8. The apparatus of claim 1 wherein a support structure carrying lights is mounted on the second support.

9. The apparatus of claim 8 wherein the lights are strobe lights which are on when the imaging device captures images.

10. The apparatus of claim 1 wherein a support structure mounted on the second support includes an adjustable mount for the imaging device permitting the portions of the vehicle imaged to be altered.

11. The apparatus of claim 1 wherein a support structure mounted on the second support includes an attachment for at least one additional imaging device designed to capture images of the uppermost surface of the vehicle.

12. The apparatus of claim 1 wherein the display is composed of a plurality of smaller sections.

13. The apparatus of claim 1 wherein the display includes the background view on the side thereof facing the imaging device.

14. The apparatus of claim 13 wherein the background view is a green screen.

15. The apparatus of claim 13 wherein the display is curved such that the imaging device captures a concave portion of the display.

16. The apparatus of claim 1 wherein the first and the second supports are curved.

17. The apparatus of claim 16 wherein the curve in the first wheeled chassis and/or the second wheeled chassis defines their respective arcs of revolution.

18. The apparatus of claim 1 wherein the imaging device is a Canon 5D Mark II® or a Canon 7D®.

19. The process of claim 1 wherein the vehicle is centered between the imaging device and the display.

* * * * *